(12) United States Patent
Dadi et al.

(10) Patent No.: US 8,884,974 B2
(45) Date of Patent: Nov. 11, 2014

(54) MANAGING MULTIPLE GPU-BASED RENDERING CONTEXTS

(75) Inventors: Andrew Dadi, Seattle, WA (US);
Robert C. Aldinger, Seattle, WA (US);
Ketan K. Dalal, Seattle, WA (US);
Jason Matthew Gould, Woodinville, AA (US); Jeffrey Kay, Bellevue, WA (US);
J. Andrew Goossen, Issaquah, WA (US);
David Ruzyski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 13/209,305

(22) Filed: Aug. 12, 2011

(65) Prior Publication Data
US 2013/0038614 A1    Feb. 14, 2013

(51) Int. Cl.
*G06T 1/00* (2006.01)
*G09G 5/00* (2006.01)

(52) U.S. Cl.
CPC .......................................... *G06T 1/00* (2013.01)
USPC ............................................ 345/522; 345/637

(58) Field of Classification Search
CPC .................................. G09G 5/38; G06F 17/24
USPC .................................................. 345/637, 522
See application file for complete search history.

(56) References Cited

U.S. PATENT DOCUMENTS

| | | | |
|---|---|---|---|
| 7,987,431 B2 * | 7/2011 | Santoro et al. ................ | 715/765 |
| 2008/0055321 A1 | 3/2008 | Koduri | |
| 2008/0246772 A1 | 10/2008 | Bakalash | |
| 2009/0135180 A1 | 5/2009 | Li | |
| 2009/0160867 A1 | 6/2009 | Grossman | |
| 2010/0007668 A1 | 1/2010 | Casparian | |
| 2010/0141664 A1 | 6/2010 | Rawson | |
| 2010/0281402 A1 * | 11/2010 | Staikos et al. ................ | 715/760 |
| 2011/0025696 A1 | 2/2011 | Wyatt | |
| 2011/0050713 A1 | 3/2011 | McCrary | |
| 2012/0167122 A1 * | 6/2012 | Koskimies ..................... | 719/328 |

OTHER PUBLICATIONS

Hermann et al., "Multi-GPU and Multi-CPU Parallelization for Interactive Physics Simulations," *Europar 2010*, 12 pages, Published Date: Aug. 31-Sep. 3, 2010.

* cited by examiner

*Primary Examiner* — Hau Nguyen
(74) *Attorney, Agent, or Firm* — Timothy Chuma; Kate Drakos; Micky Minhas

(57) ABSTRACT

Content is rendered for display using a plurality of rendering contexts. Rendering is performed, at least in part, using a graphics processing unit (GPU). The plurality of rendering contexts can comprise a lower priority rendering context and a higher priority rendering context. One or more components can be associated with each of the lower priority rendering context and the higher priority rendering context. Different restrictions can be imposed on each rendering context. Restrictions can include a restriction on block size, prioritization of requests for each context, and a restriction on the number of requests in a GPU queue at a time.

17 Claims, 5 Drawing Sheets

MANAGING MULTIPLE GPU-BASED RENDERING CONTEXTS

BACKGROUND

Computing devices, such as mobile computing devices, often display different types of content (e.g., both application graphical content and system graphical content) and respond to different types of user input (e.g., keys, buttons, and tough gestures) at the same time, each of which may need to update the display. These competing demands on system resources can be problematic, particularly on mobile devices with limited processing resources, such as limited graphical processing unit (GPU) resources.

Providing a rich user experience involves balancing user interface rendering demands with perceived responsiveness. Increasingly, intensive graphical user interface applications are utilizing a graphics processing unit (GPU) for rendering, and are mixing content rendered from multiple drawing systems when compositing frames for display. Performance problems may occur when the total GPU cost for processing the content across multiple sources exceeds the allowable time required to maintain a desired framerate.

In some situations, hardware based rendering is used to increase performance for mobile devices. However, without the ability to manage GPU resources, rendering demands from some types of applications can occupy a significant portion of GPU time to the exclusion of other types of applications, and result in decreased performance and decreased responsiveness.

Therefore, there exists ample opportunity for improvement in technologies related to GPU-based rendering.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for rendering content using a plurality of rendering contexts. The plurality of rendering contexts can comprise a first rendering context (e.g., called a low priority rendering context) and a second rendering context (e.g., called a high priority rendering context). Different rendering contexts can impose different restrictions, such as block size and/or processing limitations.

According to one aspect of the techniques and tools described herein, a method is provided for rendering content for display using a plurality of rendering contexts. For a lower priority rendering context of the plurality of rendering contexts, the method comprises receiving, from a first software component associated with the lower priority rendering context, a plurality of requests to render blocks of content on a display using a graphics processing unit (GPU). The plurality of requests to render content for the lower priority rendering context are constrained to content having a pre-determined block size (e.g., a rectangular dimension restriction and/or a workload restriction), and the plurality of requests to render content for the lower priority rendering context are limited by a pre-determined processing restriction (e.g., a pre-determined number of requests in a queue for the GPU at a time, a limit on GPU processing time, and/or a priority restriction). For a higher priority rendering context of the plurality of rendering contexts, the method comprises receiving, from a second software component associated with the higher priority rendering context, a plurality of requests to render content on the display using the GPU. The plurality of requests received for the higher priority rendering context are not constrained to content having the pre-determined block size, and the plurality of requests received for the higher priority rendering context are not limited to the pre-determined processing restriction (e.g., the pre-determined number of requests in the queue for the GPU at a time, the limit on GPU processing time, and/or the priority restriction). The method further comprises displaying content on the display according to the plurality of requests received for the lower priority rendering context and the plurality of requests received for the higher priority rendering context. The method can be implemented, at least in part, by a computing device comprising a display and a GPU.

According to another aspect of the techniques and tools described herein, a framework for managing a plurality of rendering contexts is provided. The framework comprises a first software component associated with a lower priority rendering context of the plurality of rendering contexts, where the first software component renders blocks of content for display, and where each block of content rendered by the first software component is of a pre-determined block size. The framework also comprises a second software component associated with a higher priority rendering context of the plurality of rendering contexts, where the second software component renders content for display. The framework also comprises a management component that schedules access to a queue associated with a GPU. The management component restricts software components associated with the lower priority context, but not software components associated with the higher priority context, to queuing not more than a pre-determined number of blocks of content for display at a time. The management component also restricts software components associated with the lower priority context, but not software components associated with the higher priority context, to queuing blocks of content having the pre-determined block size. The framework can be implemented, at least in part, by a computing device comprising a display and a GPU.

According to another aspect of the techniques and tools described herein, a mobile device is provided for rendering content for display using a plurality of rendering contexts. The mobile device comprises a display, a memory, a GPU, and a processing unit. The mobile device is configured for performing operations. For a lower priority rendering context of the plurality of rendering contexts, the operations comprise receiving, from a first software component associated with the lower priority rendering context, a plurality of requests to render blocks of content on the display using the graphics processing unit (GPU). The plurality of requests to render content for the lower priority rendering context are constrained to content having a pre-determined block size, and the plurality of requests to render content for the lower priority rendering context are limited to a pre-determined number of requests in a queue for the GPU at a time. For a higher priority rendering context of the plurality of rendering contexts, the operations comprise receiving, from a second software component associated with the higher priority rendering context, a plurality of requests to render content on the display using the GPU. The plurality of requests received for the higher priority rendering context are not constrained to content having the pre-determined block size, and the plurality of requests received for the higher priority rendering context are not limited to a pre-determined number of requests in the queue for the GPU at a time. The operations further comprise displaying content on the display of the mobile device according to the plurality of requests received for the lower priority rendering context and the plurality of requests received for the higher priority rendering context.

The foregoing and other objects, features, and advantages of the invention will become more apparent from the following detailed description, which proceeds with reference to the accompanying figures.

DETAILED DESCRIPTION

Figure 1:
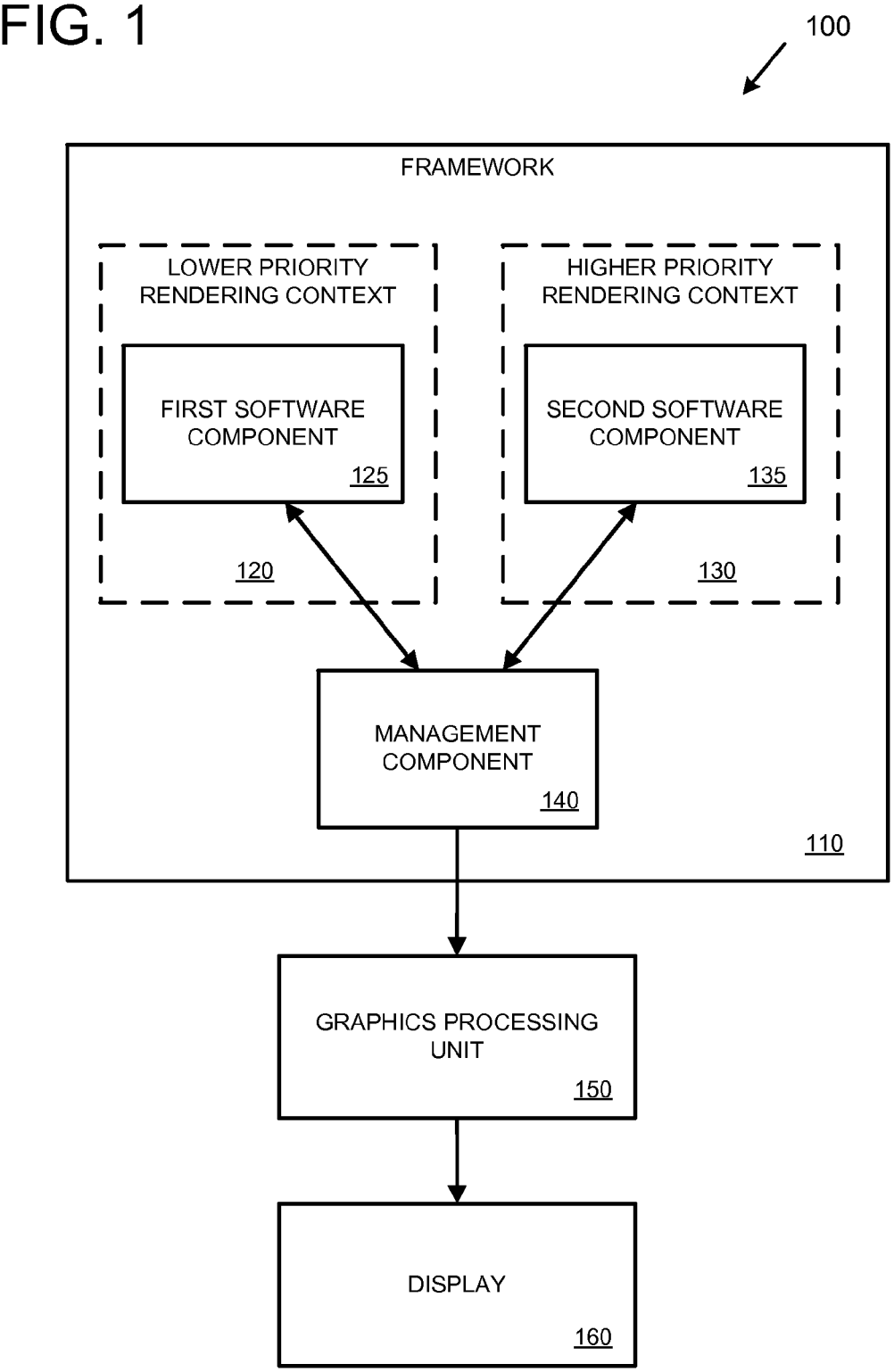
FIG. 1 is a block diagram depicting an example framework for managing a plurality of rendering contexts.

The following description is directed to techniques and solutions for rendering content using a plurality of rendering contexts. For example, the plurality of rendering contexts can comprise a lower priority rendering context and a higher priority rendering context. Using multiple rendering contexts can provide high graphics processing unit (GPU) utilization while maintaining a low impact on interactivity and responsiveness. Using multiple rendering contexts can be helpful for devices with limited GPU resources, such as mobile phone devices. However, the techniques and solutions described herein can be applicable to many types of systems that render content (e.g., graphics, text, user interface elements, or any other type of graphical display content) for display using a GPU.

Rendering Contexts

In the techniques and solutions described herein, rendering contexts are used to control prioritization and/or scheduling of access to a graphics processing unit (GPU). In order to provide more efficient display of content, different rendering contexts can be provided to different software and/or hardware components. For example, one or more software components that control display of user interface elements and/or receive or respond to user interface input can use one rendering context. One or more other software components that render background content (e.g., web content, map content, or other types of content) can use a different rendering context.

The use of different rendering contexts for different purposes can allow a device to provide better performance than the use of a single rendering context. For example, one rendering context can be provided to handle user interface activity. Perceived user responsiveness is one measure of system performance, and a responsive system can provide a better user experience. Another rendering context can be provided to handle other display activities, such as rendering content that may take an uncertain amount of time or content that is not expected to respond quickly to user interaction. By applying different priority and/or scheduling parameters to the different rendering contexts, user interface responsiveness can be maintained while still allowing other rendering activity to occur.

If only one rendering context is provided, then responsiveness can be degraded. For example, contention can occur if a web browser is rendering web content and utilizing the GPU to the exclusion, or delay, of a component for responding to user input. In such a situation, a user may make a user interface gesture, such as a zoom or pan. Rendering a response to the user interface gesture may be slow or delayed because the system's GPU is busy handing web content from a web browser component.

In a specific implementation, one rendering context can be provided for components related to user interface activity (e.g., displaying user interface elements or responding to user interface input). An example of displaying user interface elements can be display of buttons, icons, pop-up messages (e.g., an incoming text message alert or calendar event alert), or other user interface elements. An example of responding to user interface input can be receiving a zoom or pan gesture from a user and, in response, zooming or panning content displayed on a display.

Rendering contexts can be given descriptive names. For example, a "higher priority" rendering context can refer to a rendering context that, in some respects, has higher priority than one or more other rendering contexts. A "lower priority" rendering context can refer to a rendering context that, in some respects, has a lower priority than one or more other rendering contexts. Instead of "higher priority" and "lower priority," other names could be used (e.g., normal rendering context and low priority rendering context, or first rendering context and second rendering context, etc.). In general, a rendering context is defined by the limitations and restrictions it imposes, and not by the name it is given.

Blocks of Content

In the techniques and solutions described herein, content for display can be divided into blocks of content (e.g., based on sections of display area). In a specific implementation, a block of content refers to display area of specific dimensions (e.g., rectangular dimensions). A software component can render a block of content to device memory using a GPU, and display the block of content on a display (e.g., using one or more other software components).

In other implementations, a block of content can refer to a specific unit of work, such as workload representing a specific amount of computation (e.g., one rotation of an object). For example, a specific rendering context can impose a restriction, for dividing content for display, of a pre-determined block size represents representing a pre-determined workload, where the pre-determined workload is defined, at least in part, by an amount of time a GPU spends on the pre-determined workload.

A display area corresponding to a display of a computing device (e.g., a mobile phone display) can be divided into blocks of equal size. For example, a mobile phone device with display dimensions of 480 by 800 pixels can be divided into 12 blocks of the same size, each 160 by 200 pixels. Different implementations can use different size blocks (e.g., by dividing up a display into a greater or fewer number of blocks). Furthermore, blocks can be associated with a specific memory size. For example, each block of specific dimensions may represent a specific amount of device memory (e.g., 256KB) which is used to display the block of content on the device's display.

Block size can be chosen based on different criteria. For example, a specific block size can be chosen based on GPU requirements or settings. The block size can also be chosen to provide a specific desired block display rate. In a specific implementation, block size is chosen such that the device hardware supports a display rate of approximately 240 blocks-per-second.

Different rendering contexts can impose different restrictions on the components that use the rendering context. For example, a lower priority rendering context can impose a restriction of a pre-determined block size on components that use the lower priority rendering context. A higher priority rendering context may not impose such a pre-determined block size restriction (e.g., a software component that uses the higher priority rendering context may render content in blocks of larger size than the pre-determined block size).

Framework for Managing a Plurality of Rendering Contexts

FIG. 1 is a block diagram (100) depicting an example framework (110) for managing a plurality of rendering contexts. In the example framework (110), there are two rendering contexts, a lower priority rendering context (120) and a higher priority rendering context (130). The framework (110) manages rendering activity for rendering content using a graphics processing unit (GPU) (150) for display on a display (160).

A first software component (125) is associated with the lower priority rendering context (120). For example, the first software component (125) can be a GPU-based renderer (e.g., comprising a web rendering component). In addition to the first software component (125), other components (e.g., other software components) can be associated with the lower priority rendering context (120). The lower priority rendering context (120) imposes certain restrictions on the components, such as the first software component (125), which use the lower priority rendering context (120). Such restrictions can include a restriction to rendering content of a pre-determined block size and/or a GPU processing restriction, such as a priority restriction (e.g., process blocks associated with the higher priority context before the lower priority context) and/or a limit on the number of blocks that can be queued in a GPU queue at a time.

A second software component (135) is associated with the higher priority rendering context (130). For example, the second software component (135) can be a component that is responsible for drawing user interface elements on the display (160) and for responding to user interface input (e.g., pan and zoom gestures). In addition to the second software component (135), other components (e.g., other software components) can be associated with the higher priority rendering context (130). The higher priority rendering context (130) imposes fewer, or no, restrictions on the components, such as the second software component (135), which use the higher priority rendering context (130). For example, the higher priority rendering context (130) may not impose a pre-determined block size limit and/or a GPU processing restriction (e.g., GPU queue limit on components) on components, such as the second software component (135), which use the higher priority rendering context (130).

The framework (110) includes a management component (140) (e.g., implemented in software and/or hardware). The management component (140) manages requests to render content using the GPU (150). The management component (140) manages requests from components, such as the first software component (125), associated with the lower priority rendering context (120) and components, such as the second software component (135), associated with the higher priority rendering context (130).

The management component (140) can schedule access to the GPU (150). For example, the management component (140) can prioritize requests from components of the lower priority rendering context (120) and components of the higher priority rendering context (130) (e.g., schedule higher priority requests, from the higher priority rendering context (130), before lower priority requests, from the lower priority rendering context (120)). The management component (140) can also restrict access to a queue for requests to the GPU (150). For example, the management component (140) can limit the number of requests in the queue for components of the lower priority rendering context (120) (e.g., only allow one request in the queue at a time). The management component (140) can also impose other restrictions, such as a pre-determined block size requirement on components of the lower priority rendering context (120), such as the first software component (125).

In other implementations, the number of rendering contexts managed by the framework (110) can be increased (e.g., there can be three, or more, rendering contexts). Each rendering context can provide different restrictions on content rendered using each specific context. For example, each rendering context can impose a different limit on the number of requests in the queue for the GPU.

Rendering Content Using a Plurality of Rendering Contexts

Figure 2:
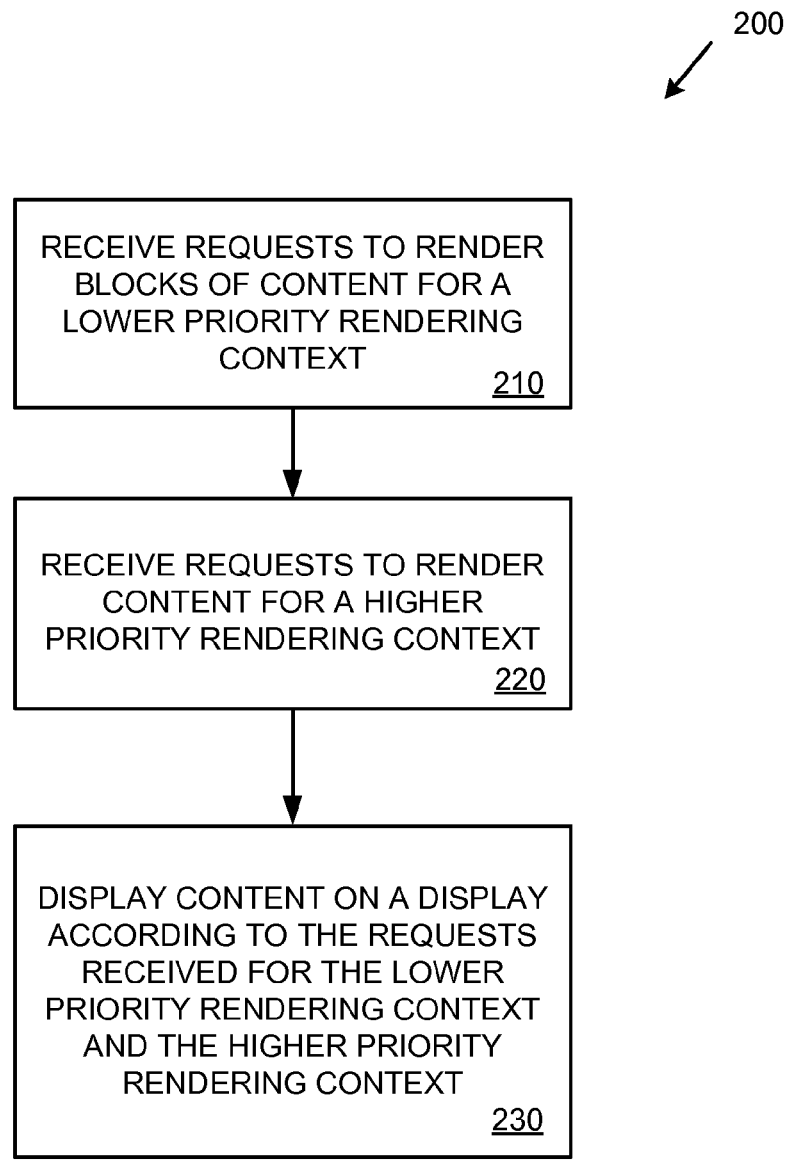
FIG. 2 is a flowchart depicting an example method for rendering content for display using a plurality of rendering contexts.

FIG. 2 shows an exemplary method (200) for rendering content for display using a plurality of rendering contexts. At (210), requests to render blocks of content are received for a lower priority rendering context. Rendering the blocks of content comprises hardware rendering using, at least in part, a graphics processing unit (GPU). For example, the GPU can be a GPU of a mobile computing device, such as a mobile phone. The requests (210) to render the blocks of content can be received from a first software component, where the first software component is associated with the lower priority rendering context. For example, the first software component can be a GPU-based renderer (e.g., comprising web renderer that renders web content). In addition to the first software component, on or more other components can be associated with the lower priority rendering context.

Various restrictions can be imposed by the lower priority rendering context on the requests (210) to render the blocks of content. One restriction can be the imposition of a pre-determined block size for the blocks of content received for the lower priority rendering context. The pre-determined block size can be defined in terms of display dimensions (e.g., 64 by 64 pixels of display area per block) and/or in terms of memory area corresponding to specific display dimensions (e.g., 256KB per block).

In a specific implementation, the blocks of content are referred to as "tiles," where each tile represents a rectangular display area of pre-determined dimensions (e.g., 160 by 200 pixels). Display area of a device can be divided into tiles (e.g., equally sized tiles) which combine to cover the display area without any overlapping. Tiles do not have to represent an on-screen display area. Tiles can represent off-screen display area which allows content to be rendered for areas which are not currently being displayed (e.g., in preparation for display in response to zoom and/or pan operations).

Another restriction that can be imposed by the lower priority rendering context on the requests (210) to render the blocks of content can be a GPU processing restriction, such as a limitation on the number of requests for blocks of content that can be in the queue for the GPU at a time. For example, the lower priority rendering context may restrict components using the lower priority rendering context to only two requests in the GPU queue at any time. In a specific implementation, components associated with the lower priority rendering context are limited to only one request in the queue for the GPU at a time. For the lower priority context, once a request in the queue has finished, another request can be sent to the GPU.

The lower priority rendering context can impose other restrictions on the requests (210) to render the blocks of content. For example, components associated with the lower priority rendering context may render their blocks of content to an off-screen area of device memory.

At (220), requests to render content are received for a higher priority rendering context. Rendering the content comprises hardware rendering using, at least in part, a graphics processing unit (GPU). The requests (220) to render the content can be received from a second software component, where the second software component is associated with the higher priority rendering context. For example, the second software component can be a component that renders user interface elements and/or responds to user interface input (e.g., tap, pan, and zoom gestures). In addition to the second software component, on or more other components can be associated with the higher priority rendering context.

The higher priority rendering context is intended to provide higher priority access to GPU resources than the lower priority rendering context. Therefore, there are fewer restrictions imposed on requests (220) to render content for the higher priority rendering context than the requests (210) to render blocks for the lower priority rendering context. For example, a higher priority can be assigned to requests (220) to render content for the higher priority rendering context, and a lower priority can be assigned to requests (210) to render blocks for the lower priority rendering context.

Instead of the pre-determined block size imposed for the lower priority rendering context, the higher priority rendering context may impose no restriction on the size of content to be rendered for components using the higher priority rendering context. For example, the requests (220) to render content for the higher priority rendering context may cover an entire display area (which may be divided into blocks and/or tiles). While no specific size limitation may be imposed by the higher priority rendering context, components that are associated with the higher priority rendering context may still divide their work into chunks (which may be called blocks or tiles) of a specific size (e.g., for reasons such as hardware or software requirements).

Furthermore, the higher priority rendering context may not impose a limitation on the number of requests in the queue for the GPU. Alternatively, the higher priority rendering context may impose a limitation that is higher than the lower priority rendering context (e.g., a limit of one request for the lower priority rendering context and a limit of 4 requests for the higher priority rendering context).

By imposing certain restrictions on the lower priority rendering context requests (210) and fewer (or no) restrictions on the higher priority rendering context (220), the method (200) can tailor responsiveness for various system components, such as software components. For example, components that render background content, such as web content, can be assigned to the lower priority rendering context. Components that render content associated with user interaction, such as user interface elements that need to update or respond quickly, can be assigned to the higher priority rendering context. For example, a mobile device can render a web page (which may take a long time depending on complexity of the page, speed of the network connection, etc.), while still being responsive to user interface input (e.g., respond quickly to a button push, a pan action, or a zoom gesture).

In a specific implementation with a pre-determined block size and a one request queue limit for the lower priority rendering context, the higher priority rendering context has to wait at most for one pre-determined block to be rendered before gaining access to the GPU. This known and fixed limit on the wait time for the components associated with the higher priority rendering context can allow system designers to obtain a desired level of responsiveness to user interface input activity.

Figure 3:
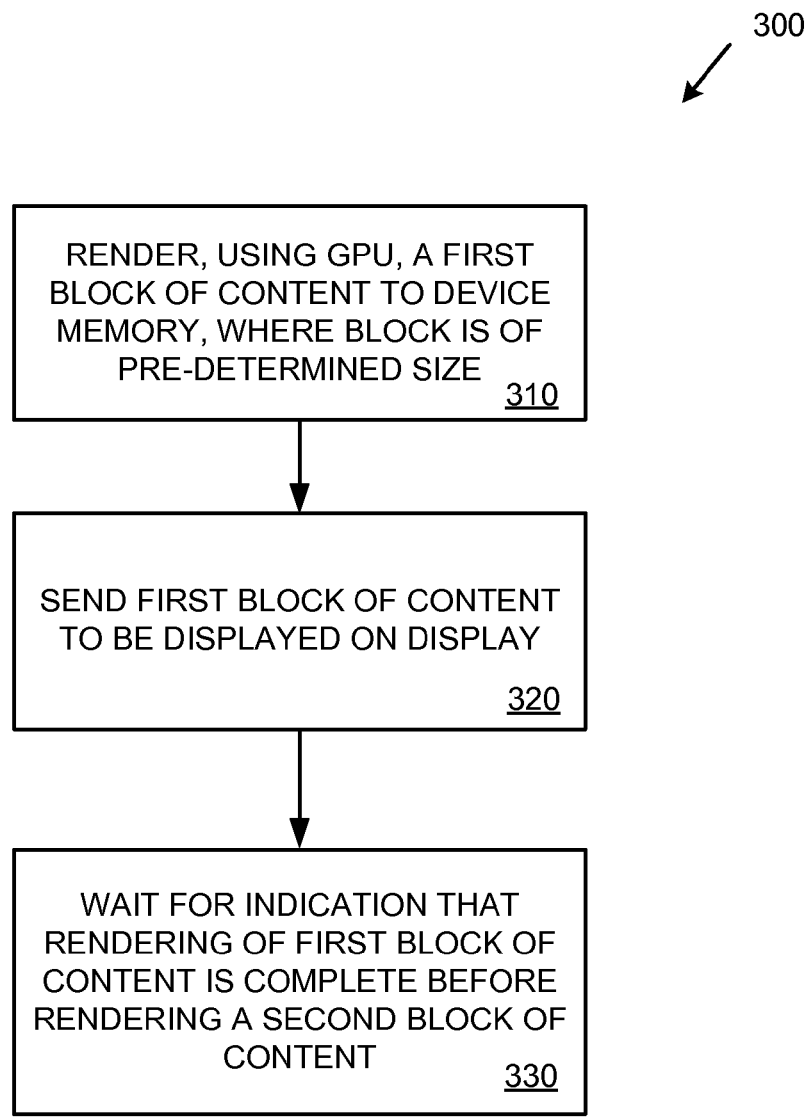
FIG. 3 is a flowchart depicting an example method for rendering content within a lower priority rendering context.

FIG. 3 is a flowchart depicting an example method (300) for rendering content within a lower priority rendering context. At (310), a first block of content is rendered to device memory using, at least in part, a GPU. In a specific implementation, the first block of content is rendered to an off-screen memory area. The lower priority rendering context imposes certain restrictions on blocks of content rendered using the lower priority rendering context, such as a pre-determined block size and GPU queue limit.

At (320), the first block of content that has been rendered (310) is displayed. In a specific implementation, the first block of rendered content (310) is composited with user interface elements and then displayed on a display of a computing device.

At (330), an indication is received that rendering of the first block of content is complete before rendering a second block of content. This method (300) uses a GPU queue size of one request for the lower priority rendering context. However, the method (300) can be altered to use a different queue size (e.g., by allowing two, or more, blocks of content to be in the GPU queue at a time for the lower priority rendering context).

Figure 4:
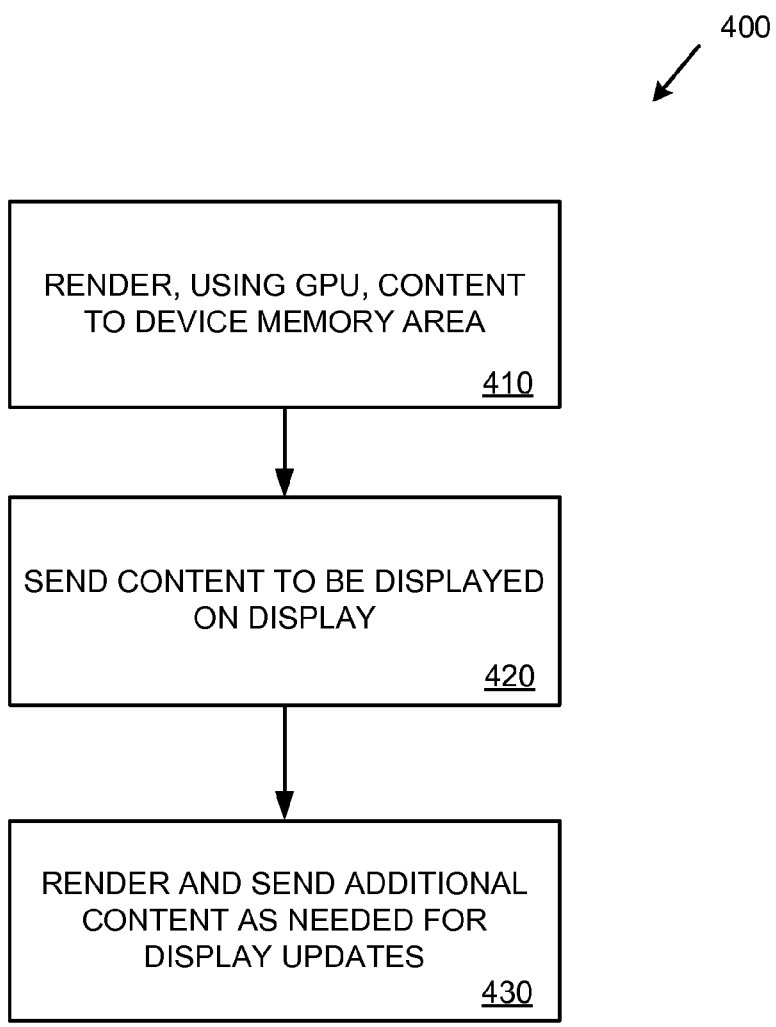
FIG. 4 is a flowchart depicting an example method for rendering content within a higher priority rendering context.

FIG. 4 is a flowchart depicting an example method (400) for rendering content within a higher priority rendering context. At (410), content is rendered to device memory using, at least in part, a GPU. In a specific implementation, the content is rendered to an on-screen memory area. The higher priority rendering context imposes fewer, or no, restrictions on content rendered using the higher priority rendering context, such as no pre-determined block size and no GPU queue limit.

At (420) the content that has been rendered (410) is displayed. At (430), additional content is rendered and sent for display as needed.

Generally, the method for rendering and displaying content for the higher priority rendering context (400) operates with fewer restrictions than the method for rendering and displaying content for the lower priority rendering context (300). For example, for the lower priority rendering context (300), content for display is divided into blocks of a pre-determined size and a limit on the number of block that can be queued for the GPU is imposed.

Mobile Device

Figure 5:
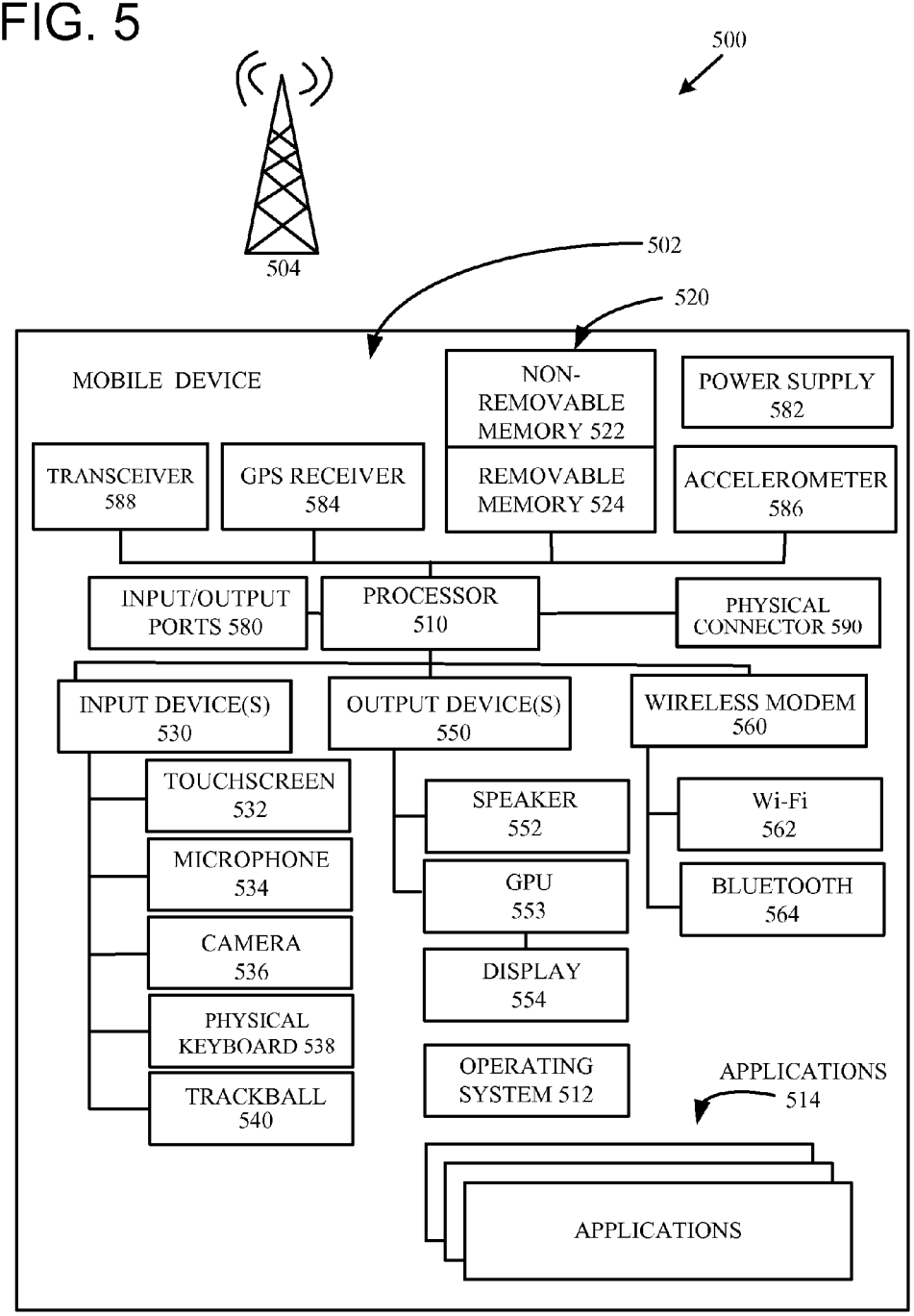
FIG. 5 is a block diagram illustrating an example mobile computing device in conjunction with which techniques and tools described herein may be implemented.

FIG. 5 depicts a detailed example of a mobile computing device (500) capable of implementing the techniques and solutions described herein. The mobile device (500) includes a variety of optional hardware and software components, shown generally at (502). In general, a component (502) in the mobile device can communicate with any other component of the device, although not all connections are shown, for ease of illustration. The mobile device can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks (504), such as a Wi-Fi, cellular, or satellite network.

The illustrated mobile device (500) includes a controller or processor (510) (e.g., signal processor, microprocessor, ASIC, or other control and processing logic circuitry) for performing such tasks as signal coding, data processing, input/output processing, power control, and/or other functions. An operating system (512) controls the allocation and usage of the components (502) and support for one or more application programs (514) such as software components that implement one or more of the innovative features described herein. In addition, the application programs can include common mobile computing applications (e.g., telephony applications, email applications, calendars, contact managers, web browsers, messaging applications), or any other computing application.

The illustrated mobile device (500) includes memory (520). Memory (520) can include non-removable memory (522) and/or removable memory (524). The non-removable memory (522) can include RAM, ROM, flash memory, a hard disk, or other well-known memory storage technologies. The removable memory (524) can include flash memory or a Subscriber Identity Module (SIM) card, which is well known in Global System for Mobile Communications (GSM) communication systems, or other well-known memory storage technologies, such as "smart cards." The memory (520) can be used for storing data and/or code for running the operating system (512) and the applications (514). Example data can include web pages, text, images, sound files, video data, or other data sets to be sent to and/or received from one or more network servers or other devices via one or more wired or wireless networks. The memory (520) can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device (500) can support one or more input devices (530), such as a touch screen (532) (e.g., capable of capturing finger tap inputs, finger gesture inputs, or keystroke inputs for a virtual keyboard or keypad), microphone (534) (e.g., capable of capturing voice input), camera (536) (e.g., capable of capturing still pictures and/or video images), physical keyboard (538), buttons and/or trackball (540) and one or more output devices (550), such as a speaker (552) and a display (554). Other possible output devices (not shown) can include piezoelectric or other haptic output devices. Some devices can serve more than one input/output function. For example, touchscreen (532) and display (554) can be combined in a single input/output device.

The mobile device (500) can provide one or more natural user interfaces (NUIs). For example, the operating system (512) or applications (514) can comprise speech-recognition software as part of a voice user interface that allows a user to operate the device (500) via voice commands. For example, a user's voice commands can be used to provide input to a map navigation tool.

A wireless modem (560) can be coupled to one or more antennas (not shown) and can support two-way communications between the processor (510) and external devices, as is well understood in the art. The modem (560) is shown generically and can include, for example, a cellular modem for communicating at long range with the mobile communication network (504), a Bluetooth-compatible modem (564), or a Wi-Fi-compatible modem (562) for communicating at short range with an external Bluetooth-equipped device or a local wireless data network or router. The wireless modem (560) is typically configured for communication with one or more cellular networks, such as a GSM network for data and voice communications within a single cellular network, between cellular networks, or between the mobile device and a public switched telephone network (PSTN).

The mobile device can further include at least one input/output port (580), a power supply (582), a satellite navigation system receiver (584), such as a Global Positioning System (GPS) receiver, sensors (586) such as an accelerometer, a gyroscope, or an infrared proximity sensor for detecting the orientation and motion of device (500), and for receiving gesture commands as input, a transceiver (588) (for wirelessly transmitting analog or digital signals) and/or a physical connector (590), which can be a USB port, IEEE 1394 (FireWire) port, and/or RS-232 port. The illustrated components (502) are not required or all-inclusive, as any of the components shown can be deleted and other components can be added.

The mobile device can determine location data that indicates the location of the mobile device based upon information received through the satellite navigation system receiver (584) (e.g., GPS receiver). Alternatively, the mobile device can determine location data that indicates location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to a map navigation tool for use in map navigation. For example, the map navigation tool periodically requests, or polls for, current location data through an interface exposed by the operating system (512) (which in turn may get updated location data from another component of the mobile device), or the operating system (512) pushes updated location data through a callback mechanism to any application (such as the map navigation tool) that has registered for such updates.

The mobile device (500) can implement the technologies described herein. For example, the applications (514) can include various components for managing a plurality of rendering contexts for rendering content using the GPU (553) for display on the display (554). The applications (514) can include components, such as a web browser component, associated with a lower priority rendering context. The applications (514) can include components, such as a component that renders user interface elements or respond to user interface input, associated with a higher priority rendering context. The applications (514) can also include software, such as a management component and/or framework, that manages the plurality of rendering contexts (e.g., schedules and/or prioritizes access of various components to the GPU (553)).

The mobile device (500) can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing) can be performed in the cloud.

Although FIG. 5 illustrates a mobile device (500), more generally, the techniques and solutions described herein can be implemented with devices having other screen capabilities and device form factors, such as a desktop computer, a television screen, or device connected to a television (e.g., a set-top box or gaming console). Services can be provided by the cloud through service providers or through other providers of online services. Thus, the techniques and solutions described herein can be implemented with any of the connected devices as a client computing device. Similarly, any of various computing devices in the cloud or a service provider can perform the role of server computing device and deliver data to the connected devices.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented at least in part by a computing device comprising a display and a graphics processing unit (GPU), for rendering content for display using a plurality of rendering contexts, the method comprising:

for a lower priority rendering context of the plurality of rendering contexts:
receiving, from a first software component associated with the lower priority rendering context, a plurality of requests to render blocks of content on the display using the GPU, the blocks of content for the lower priority rendering context having a pre-determined block size, and the plurality of requests to render blocks of content for the lower priority rendering context being limited to a pre-determined number of requests in a queue for the GPU at a time:
wherein each request is for rendering a specific block of content;
wherein the first software component is a GPU-based renderer and is responsible for rendering background content, the background content being content other than user interface elements;
and wherein a lower priority is applied to the plurality of requests to render content for the lower priority rendering context; for a higher priority rendering context of the plurality of rendering contexts:
receiving, from a second software component associated with the higher priority rendering context, a plurality of requests to render content on the display using the GPU, the requests to render content for the higher priority rendering context not having the pre-determined block size, and the plurality of requests to render content for the higher priority rendering context not being limited to the pre-determined number of requests in the queue for the GPU at a time;
wherein the second software component is responsible for drawing user interface elements on the display and for receiving user interface input from a user of the computing device;
and wherein a higher priority is applied to the plurality of requests received for the higher priority rendering context; and
displaying content on the display of the computing device according to the plurality of requests received for the lower priority rendering context and the plurality of requests received for the higher priority rendering context.

2. The method of claim 1 wherein the pre-determined block size represents a pre-determined workload, and wherein the pre-determined workload is defined, at least in part, by an amount of time the GPU spends on the pre-determined workload.

3. The method of claim 1 wherein the pre-determined block size is a tile representing a rectangular display area of pre-determined dimensions, and wherein a display area, corresponding to the display of the computing device, is divided into a plurality of non-overlapping tiles that together cover the display area.

4. The method of claim 1 wherein the plurality of requests to render blocks of content for the lower priority rendering context are limited to one request in the queue for the GPU at a time.

5. The method of claim 1 wherein: the first software component associated with the lower priority rendering context draws the blocks of content to an off-screen memory area; and the second software component associated with the higher priority rendering context draws its content to an on-screen memory area.

6. The method of claim 1 wherein the computing device is a mobile phone device, wherein the GPU-based renderer comprises a web renderer, and wherein the receiving user interface input by the second software component comprises receiving user interface gestures, via a touch screen interface, from the user of the computing device, wherein the user interface gestures comprise pan and zoom gestures.

7. The method of claim 1 wherein the computing device provides display of the user interface elements and response to the user interface input with limited delay by enforcing, for the lower priority rendering context, the pre-determined block size, and by processing the higher priority requests before the lower priority requests.

8. A computing device comprising a display and a graphics processing unit (GPU), the computing device comprising:
a first software component associated with a lower priority rendering context of a plurality of rendering contexts, wherein the first software component renders blocks of content for display, wherein each block of content rendered by the first software component is of a pre-determined block size, and wherein the first software component is a GPU-based renderer and is responsible for rendering background content, the background content being content other than user interface elements;
a second software component associated with a higher priority rendering context of the plurality of rendering contexts, wherein the second software component renders content for display, and wherein the second software component is responsible for drawing user interface elements on the display and for receiving user interface input from a user of the computing device; and
a management component that schedules access to a queue associated with the GPU, wherein the management component:
restricts software components associated with the lower priority context, but not software components associated with the higher priority context, to queuing blocks of content having the pre-determined block size and queuing not more than a pre-determined number of blocks of content for display at a time; and
prioritizes content queued by the software components associated with the higher priority rendering context ahead of content queued by the software components associated with the lower priority rendering context.

9. The computing device of claim 8 wherein: the first software component associated with the lower priority rendering context draws the blocks of content to an off-screen memory area; and
the second software component associated with the higher priority rendering context draws its content to an on-screen memory area.

10. The computing device of claim 8 wherein the computing device is a mobile phone device, wherein the GPU-based renderer comprises a web renderer, and wherein the receiving user interface input by the second software component comprises receiving user interface gestures, via a touch screen interface, from the user of the computing device, wherein the user interface gestures comprise pan and zoom gestures.

11. The computing device of claim 8 wherein the management component provides display of the user interface elements and response to the user interface input with limited delay by enforcing, for the lower priority rendering context, the pre-determined block size and by the prioritizing of the content.

12. A mobile device for rendering content for display using a plurality of rendering contexts, the mobile device comprising:
a display;
a memory;
a graphics processing unit (GPU); and
a processing unit;
wherein the mobile device is configured for performing operations comprising:
for a lower priority rendering context of the plurality of rendering contexts:
receiving, from a first software component associated with the lower priority rendering context, a plurality of requests to render blocks of content on the display using the GPU, the blocks of content for the lower priority rendering context having a pre-determined block size, and the plurality of requests to render blocks of content for the lower priority rendering context being limited to a pre-determined number of requests in a queue for the GPU at a time; wherein each request is for rendering a specific block of content;
wherein the first software component is a GPU-based renderer and is responsible for rendering background content, the background content being content other than user interface elements;
and wherein a lower priority is applied to the plurality of requests to render content for the lower priority rendering context; for a higher priority rendering context of the plurality of rendering contexts:
receiving, from a second software component associated with the higher priority rendering context, a plurality of requests to render content on the display using the GPU, the requests to render content for the higher priority rendering context not having the pre-determined block size, and the plurality of requests to render content for the higher priority rendering context not being limited to the pre-determined number of requests in the queue for the GPU at a time;
wherein the second software component is responsible for drawing user interface elements on the display and for receiving user interface input from a user of the mobile device;
and
wherein a higher priority is applied to the plurality of requests received for the higher priority rendering context; and
displaying content on the display of the mobile device according to the plurality of requests received for the lower priority rendering context and the plurality of requests received for the higher priority rendering context.

13. The mobile device of claim 12 wherein the pre-determined block size represents a pre-determined workload, and wherein the pre-determined workload is defined, at least in part, by an amount of time the GPU spends on the pre-determined workload.

14. The mobile device of claim 12 wherein the pre-determined block size is a tile representing a rectangular display area of pre-determined dimensions, and wherein a display area, corresponding to the display of the mobile device, is divided into a plurality of non-overlapping tiles that together cover the display area.

15. The mobile device of claim 12 wherein: the first software component associated with the lower priority rendering context draws the blocks of content to an off-screen are of the memory; and the second software component associated with the higher priority rendering context draws its content to an on-screen area of the memory.

16. The mobile device of claim 12 wherein the mobile device is a mobile phone device, wherein the GPU-based renderer comprises a web renderer, and wherein the receiving user interface input by the second software component comprises receiving user interface gestures, via a touch screen interface, from the user of the mobile device, wherein the user interface gestures comprise pan and zoom gestures.

17. The mobile device of claim 12 wherein the mobile device provides display of the user interface elements and response to the user interface input with limited delay by enforcing, for the lower priority rendering context, the pre-determined block size, and by processing the higher priority requests before the lower priority requests.

* * * * *